Patented Sept. 28, 1943

2,330,230

UNITED STATES PATENT OFFICE 2,330,230

DIELECTRIC LIQUID

Russell M. Mantell, New Bedford, Mass., assignor to Aerovox Corporation, New Bedford, Mass., a corporation of New York No Drawing. Application October 28, 1940,
Serial No. 363,156

7 Claims. (Cl. 252—64)

While all of the desirable characteristics of the present invention in liquid di-electrics are utilized in the application to condensers, more especially to heavy duty outdoor power factor condensers, the di-electric is also of high utility with respect to some of its improved characteristics for other electrical apparatus, especially heavy duty apparatus, including transformers, power switches, high tension fuses, and circuit breakers.

The following are essential and perhaps equally important characteristics of the ideal di-electric for power factor condenser use:

1. Liquidity over the entire range of temperature to which the apparatus may be subjected in actual use, ranging from Arctic cold to torrid heat.
2. Substantial uniformity of capacity throughout said wide range of temperature.
3. High insulation resistance.
4. Stability with absence of fire point.
5. High di-electric constant.

It is among the objects of the invention to provide a di-electric liquid, which may be readily prepared at reasonable cost and presents all of the foregoing characteristics.

The dibromoethylbenzene at present obtainable on the market is a liquid and comprises a brominated aryl nucleus that contains an aliphatic and specifically an ethyl substituent. It probably comprises a mixture of various isomers of $Br_2C_6H_3C_2H_5$, and since these are not easy to segregate, the material is commonly designated as $x$-dibromoethylbenzene. That substance presents a high power factor and low insulation resistance which render it unsuitable as a di-electric for many purposes and especially for power factor condensers.

According to the present invention, the material is processed by treating it with alkali metal at a controlled range of temperature, washing it, filtering and drying it.

A preferred specific treatment for the $x$-dibromoethylbenzene of commerce is to introduce in 100 parts by weight of the material .15 more or less parts of metallic sodium. The temperature is controlled to stay preferably in the range of between 100 and 110 degrees C. while the reaction proceeds, but these temperature limits are not critical. The resulting product is washed preferably with water and then treated to free it of moisture and objectionable impurities by filtration thru fuller's earth or equivalent chemical adsorbent, and finally it is dried. If the chemical adsorbent is previously dried, the purification and drying of the material may be performed in a single operation.

I have observed that in this treatment, the originally colorless liquid becomes dark, and after the final purification above set forth it becomes yellow. Just what the chemistry or physics of the matter is I do not know. In the absence of the treatment with alkali metal, the mere washing, filtration and drying does not effect the material improvement set forth.

Regardless why the sodium treatment leads to the improvement noted, the power factor which in the untreated material is of the order of six per cent, comes down as a result of the treatment above set forth to approximately 0.15 per cent at room temperature. Even at 85 degrees C., substantially the highest temperature encountered in actual condenser use, the power factor does not exceed approximately two per cent at 60 cycles A. C. The di-electric constant of the material is closed to 5 and approximates 4.8. The insulation resistance is high. At room temperature, units incorporating the di-electric of the present invention have a quality characteristic measured by the product of resistance in megohms and capacitance in microfarads of the order of 5,000 or more. The temperature-capacity behavior is excellent in that change in capacity over a range from 85 degrees C. down to minus 60 degrees C., a wider range than is ever incurred in actual use, is but little as contrasted with liquids heretofore commonly used for the purpose, in which a loss of capacitance of 30 per cent is incurred even at as high a temperature as minus 30 degrees C. Throughout the entire range of temperature, the material remains liquid. The material is fire resistant, it has no fire point, it gives off no inflammable vapor, it presents no fire hazard, and is thoroughly noninflammable. The substance of the present invention thus completely meets all of the requirements above pointed out, for heavy duty outdoor condenser di-electrics, and therefore it also meets the less severe and diverse requirements of other electrical apparatus.

While the di-electric constant of approximately 4.8 which the material of the present invention possesses, is amply high for most purposes, the material lends itself to further increase in di-electric constant without sacrifice of any of the other advantageous properties thereof by blending the same with small proportions in the order of one half to ten per cent by weight of benzophenone of high purity, a solid of higher di-electric constant readily soluble in the dibromo-ethylbenzene. The increase in dielectric constant attained varies in a direct ratio with the proportion of the benzophenone added.

As many changes could be made in the above substance and method and many apparently widely different embodiments of this invention could be made without departing from the scope of the claims, it is intended that all matter contained in the above description shall be interpreted as illustrative and not in a limiting sense.

Having thus described my invention, what I claim as new and desire to secure by Letters Patent of the United States is:

1. A di-electric suitable for heavy duty condensers comprising a non-inflammable liquid having high insulation resistance, a di-electric constant in excess of 4.0, having a power factor below 2 per cent under the most adverse conditions of operation, having minor capacity change throughout the widest ranges of temperature variation incurred in various localities, said material consisting essentially of the product resulting from the treatment of dibromoethylbenzene of commerce with metallic sodium within controlled temperature range, washing, filtration and drying.

2. The process of preparing a non-inflammable di-electric of di-electric constant in excess of 4.5, of capacitance varying little for the widest ranges of temperature changes incurred in outdoor use, of a power factor below two per cent under the most adverse conditions of operation and of high insulation resistance, which consists in subjecting the dibromoethylbenzene of commerce to an alkali metal within controlled temperature range, then washing the product and filtering and drying the same with fuller's earth.

3. The process of preparing a non-inflammable di-electric of di-electric constant in the neighborhood of 4.8, and varying little for the widest ranges of temperature changes incurred in outdoor use, of a power factor below two per cent under the most adverse conditions of operation and of high insulation resistance, which consists in adding to the dibromoethylbenzene of commerce approximately 0.15 per cent by weight of metallic sodium, while maintaining the temperature within a fixed range between 100 degrees C. and 110 degrees C. throughout the progress of the reaction, then washing the product with distilled water, filtering the same with fuller's earth and finally drying the same.

4. A dielectric suitable for heavy duty condensers comprising a non-inflammable liquid consisting essentially of dibromoethylbenzene and having substantially those electrical properties that would result from the treatment of x-dibromoethylbenzene with metallic sodium, said properties including a high insulation resistance, a dielectric constant in excess of 4.0, a power factor below two per cent under the most adverse conditions of operation and but minor capacity change throughout the widest range of temperature variations incurred in various localities of use.

5. A dielectric suitable for heavy duty condensers comprising a non-inflammable liquid consisting essentially of a mixture of various isomers of dibromoethylbenzene, and having substantially those electrical properties that would result from the treatment of x-dibromoethylbenzene with metallic sodium, said properties including a high insulation resistance, high quality characteristics measured by the product of capacitance and resistance, a dielectric constant in excess of 4.0, a power factor below two per cent under the most adverse conditions of operation and but minor capacity change throughout the widest range of temperature variations incurred in various localities of use.

6. A dielectric suitable for heavy duty condensers comprising a non-inflammable liquid consisting essentially of dibromoethylbenzene having benzophenone in solution therein, and having substantially those electrical properties that would result from the treatment of x-dibromoethylbenzene with metallic sodium, said properties including a high insulation resistance, a dielectric constant in excess of 5, a power factor below two per cent under the most adverse conditions of operation and but minor capacity change throughout the widest range of temperature variations incurred in various localities of use.

7. A dielectric suitable for heavy duty condensers comprising a non-inflammable liquid consisting essentially of various isomers of dibromoethylbenzene having benzo-phenone in solution therein, and having substantially those electrical properties that would result from the treatment of x-dibromoethylbenzene with metallic sodium, said properties including a high insulation resistance, high quality characteristics measured by the product of capacitance and resistance, a dielectric constant in excess of 5, a power factor below two percent under the most adverse conditions of operation and but minor capacity change throughout the widest range of temperature variations incurred in various localities of use.

RUSSELL M. MANTELL.